(12) United States Patent
Diao et al.

(10) Patent No.: US 7,283,787 B2
(45) Date of Patent: Oct. 16, 2007

(54) DIRECT AMPLIFYING STATION AND POSITIONING METHOD FOR MOBILE STATION THEREOF

(75) Inventors: Xinxi Diao, Shenzhen (CN); Jiancheng Du, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 22 days.

(21) Appl. No.: 10/511,569

(22) PCT Filed: Jan. 27, 2003

(86) PCT No.: PCT/CN03/00081

§ 371 (c)(1),
(2), (4) Date: Mar. 28, 2005

(87) PCT Pub. No.: WO03/092311

PCT Pub. Date: Nov. 6, 2003

(65) Prior Publication Data

US 2005/0153653 A1   Jul. 14, 2005

(30) Foreign Application Priority Data

Apr. 26, 2002   (CN) ............... 02 1 16719

(51) Int. Cl.
- H04B 7/15 (2006.01)
- H04B 7/185 (2006.01)
- H04B 3/36 (2006.01)
- H04B 7/17 (2006.01)
- H04B 17/92 (2006.01)

(52) U.S. Cl. ............ 455/11.1; 455/13.1; 375/212
(58) Field of Classification Search ............ 375/212; 455/11.1, 13.1
See application file for complete search history.

(56) References Cited

U.S. PATENT DOCUMENTS 6,005,884 A * 12/1999 Cook et al. ............ 375/132

(Continued)

FOREIGN PATENT DOCUMENTS

EP        A-1030531        8/2000

(Continued)

OTHER PUBLICATIONS

International Search Report; PCT/CN03/00081; May 15, 2003.

*Primary Examiner*—Edan Orgad
*Assistant Examiner*—Bobbak Safaipour
(74) *Attorney, Agent, or Firm*—Cantor Colburn LLP

(57) ABSTRACT

The present invention relates to a repeater for positioning mobile station and a method thereof. The repeater according to the present invention is implemented through adding a cell identifier generator module to the downlink circuit structure of a conventional repeater; said cell identifier generator module includes: a synchronization searching unit designed to search for base station synchronization signal, a time delay unit designed to generate a fixed delay between start time of cell identifier signal frame and start time of base station pilot signal frame, and a cell identifier signal generating unit designed to generate cell identifier signal code word. The mobile station positioning method determines the mobile station is in the coverage of the repeater on the basis that the time difference between base station pilot signal and cell identifier signal is consistent to the fixed delay; then the method utilizes TOA (Time of Arrival) measuring function to determine the distance from the mobile station to the repeater; thus it improves positioning accuracy of mobile stations in the coverage of the repeater. The repeater for positioning mobile station is easy to implement and can meet the positioning requirement of a plurality of mobile stations in the coverage of the repeater.

4 Claims, 4 Drawing Sheets

U.S. PATENT DOCUMENTS

| | | | |
|---|---|---|---|
| 6,014,102 A * | 1/2000 | Mitzlaff et al. | 342/457 |
| 6,185,428 B1 * | 2/2001 | Kingdon et al. | 455/456.2 |
| 6,469,984 B1 * | 10/2002 | Baker | 370/232 |
| 6,684,058 B1 * | 1/2004 | Karacaoglu et al. | 455/20 |
| 6,954,644 B2 * | 10/2005 | Johansson et al. | 455/438 |
| 2002/0177401 A1 * | 11/2002 | Judd et al. | 455/11.1 |
| 2003/0008652 A1 * | 1/2003 | Jochim et al. | 455/431 |
| 2003/0054813 A1 * | 3/2003 | Riley et al. | 455/424 |
| 2003/0133424 A1 * | 7/2003 | Liang et al. | 370/335 |
| 2003/0181208 A1 * | 9/2003 | Lobinger et al. | 455/443 |
| 2003/0236067 A1 * | 12/2003 | Hasarchi et al. | 455/10 |
| 2005/0100102 A1 * | 5/2005 | Gazdzinski et al. | 375/242 |
| 2005/0101333 A1 * | 5/2005 | Raith | 455/456.1 |

FOREIGN PATENT DOCUMENTS

| | | |
|---|---|---|
| JP | A-2000222310 | 8/2000 |
| WO | WO-A-9929130 | 6/1999 |
| WO | WO-A-0021326 | 4/2000 |

* cited by examiner

DIRECT AMPLIFYING STATION AND POSITIONING METHOD FOR MOBILE STATION THEREOF

FIELD OF THE INVENTION

The present invention relates to mobile communication field, particularly to a repeater for positioning mobile station and a method thereof.

BACKGROUND OF THE INVENTION

To enable cellular mobile communication networks to provide new services, such as E911 alarm, target tracking, position-based information service (e.g., searching for the optimal traffic route or the nearest petrol station), mobile station positioning technology has to be introduced to position mobile stations.

Presently, there are 3 basic methods for positioning mobile stations in cellular mobile communication networks: 1) TOA (Time Of Arrival) positioning method, which obtains distances from mobile station to corresponding bases station through measuring TOAs of a mobile station to three or more base stations and then estimates the position of the mobile station through solving a circle equation set; 2) TDOA (Time Difference Of Arrival) positioning method, which obtains distance difference to corresponding base stations through measuring TDOAs from a mobile station to three or more base stations and then estimates the position of the mobile station through solving a hyperbolic equation set; 3) a method combining CELL-ID (Cell Identifier) and TOA, which utilizes the cell identifier to determine the position of the service cell where the mobile station is in and then further determine the position of the mobile station in the cell through measuring TOA from the mobile station to the service base station.

In conventional mobile communication systems, to ensure normal communication between mobile stations and a base station, repeaters are deployed in some areas that are not covered by the base station. FIG. 1 is a structural diagram of a conventional RF repeater; in the downlink direction, the donating antenna (antenna of the service base station) picks up signals from an existing coverage area, filters off out-of-band signals with a band pass filter, and then retransmits the filtered signals to an area to be covered via a power amplifier; in uplink direction, the signals from a mobile station in the coverage area are processed similarly and then transmitted to the corresponding base station to implement signal transmission between the base station and the mobile station. The introduction of a repeater implements normal communication between mobile stations and base station in the coverage of the repeater.

However, the introduction of repeater makes mobile stations in the coverage of the repeater can't be positioned effectively. When a mobile station to be positioned is in the coverage of the repeater, TDOA positioning process will fail because the number of detected base stations is too small; even though there are enough detected base stations, what is determined finally is the position of the repeater, the position of the mobile station in the coverage of the repeater can't be determined; furthermore, the positioning system is unable to determine whether the positioning result has been affected by the repeater. Similarly, when a mobile station to be positioned is in the coverage of the repeater, due to the effect of time delay in repeater RF channel, the 'TOA+CELL-ID' method will result in severe TOA error, thus the mobile station can't be positioned effectively.

To ensure effective positioning of mobile stations in the coverage of the repeater, a 'repeater+auxiliary PE (Positioning Element)' method can be used in network deployment. However, the disadvantage of the method is: to achieve effective positioning of mobile stations, at least 3 PEs have to be deployed in the coverage of each repeater, which increases complexity of network planning as well as device procurement expense and operation and maintenance costs.

SUMMARY OF THE INVENTION

The invention provides a repeater for positioning mobile station and a method thereof, in order to improve positioning accuracy of mobile stations in the coverage of the repeater.

A repeater according to as aspect of the present invention includes: a cell identifier generator module in a downlink circuit structure of said repeater, wherein said cell identifier generator module includes: a synchronization searching unit for searching for a base station pilot signal; a time delay unit for generating a fixed delay according to the searching result from the synchronization searching unit; and a cell identifier signal generating unit for generating a cell identifier signal; wherein a delay between a frame start time of the base station pilot signal and a frame start time of the cell identifier signal is the fixed delay.

A method for positioning a mobile station using the repeater includes the steps of:

(1) issuing a cell identifier signal, a fixed delay, and a search window width from the repeater in response to a positioning request from the mobile station, wherein the cell identifier signal is searched in a time range defined by the search window width and the fixed delay;

(2) the mobile station measuring a Time Difference Of Arrival (TDOA) between the cell identifier signal and a base station pilot signal and reporting the measured TDOA;

(3) determining whether the value of TDOA equals to the fixed delay; if so, going to step (4); otherwise going to step (7);

(4) measuring a Time Of Arrival (TOA), $TOA_m$, from the mobile station to the station through the repeater;

(5) determining a value of $TOA_{trans}$ with the formula: $TOA_{trans}=TOA_m-TOA_c$, wherein the $TOA_{trans}$ means TOA from the mobile station to the repeater, and the $TOA_c$ means a calibrated TOA from the repeater to the base station;

(6) calculating the distance between the mobile station and the repeater through multiplying $TOA_{trans}$ with light velocity; and (7) determining the position of the mobile station.

It is seen from above technical proposal that the repeater according to the present invention delivers cell identifier signal transmitting function, which helps to determine whether the mobile station is in the coverage of the repeater; the bandwidth of said cell identifier signal is identical to that of base station signals forwarded by the repeater; the code word of said cell identifier signal is chosen from the scrambling code set but is different from the scrambling code used by the adjacent base station; said cell identifier signal keeps a fixed time delay to pilot signal of the base station. The repeater for mobile station positioning according to the present invention is easy to implement and can meet the positioning requirement of a plurality of mobile stations in the coverage of the repeater. The method for mobile station positioning according to the present invention utilizes the cell identifier signal of the base station transmitted by above repeater (with cell identifier signal transmitting function) and calibration for time delay of the repeater to determine whether the mobile station is in the coverage of the repeater;

if so, said method utilizes TOA measuring function to further determine the distance from the mobile station to the repeater; therefore, the method improves positioning accuracy of mobile stations in the coverage of the repeater; if the mobile station is not in the coverage of the repeater, the positioning is carried out with an existing mobile station positioning method. Therefore, the present invention attains improved positioning accuracy of mobile stations in the coverage of the repeater.

DETAILED DESCRIPTION OF THE EMBODIMENTS

To solve the problem that the mobile stations can't be positioned accurately with conventional technologies, the present invention provides the technical solution for a repeater that supports mobile station positioning and the technical solution for a method that utilizes above repeater to position mobile stations.

Figure 2:
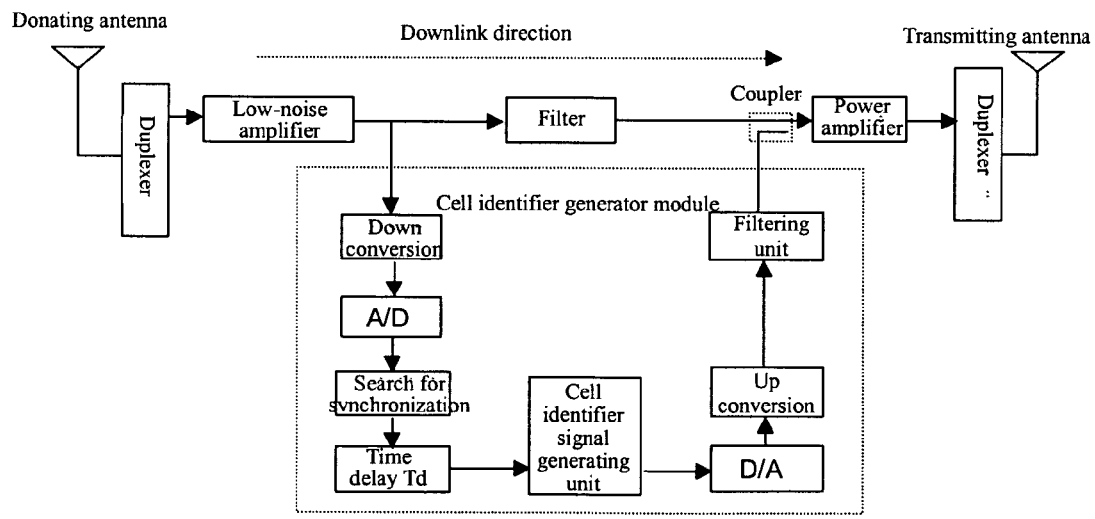
FIG. 2 shows the diagram of a repeater with cell identifier signal transmitting function.

As shown in FIG. 2, the repeater that supports mobile station positioning according to the present invention is implemented as follows: a cell identifier generator module is added in the downlink circuit structure of a conventional repeater; the input end of said cell identifier generator module is connected to the low noise amplifier module of the repeater, and the output end of said cell identifier generator module is connected to the power amplifier module of the repeater via a coupler.

Said cell identifier generator module comprises: a down-conversion unit, an A/D conversion unit, a synchronization searching unit, a time delay unit, a cell identifier signal generating unit, a D/A conversion unit, a up-conversion unit, and a filtering unit, wherein:

The down-conversion unit is designed to carry out frequency conversion from RF to intermediate frequency for received signals;

The A/D conversion unit is designed to carry out sampling and quantification for intermediate frequency signals;

The synchronization searching unit is designed to carry out frame synchronization to base station pilot signal in 3 steps: firstly, time slot synchronization, secondly, frame synchronization, thirdly, main scrambling code capturing;

The time delay unit is designed to generate fixed delay Td between frame start time of cell identifier signal and frame start time of base station pilot signal;

The cell identifier signal generating unit is designed to generate cell identifier signal code word;

The D/A conversion unit is designed to carry out D/A conversion to obtain base-band form of the cell identifier signal;

The up-conversion unit is designed to carry out conversion from base-band to RF for the cell identifier signal;

The filtering unit is designed to carry out band restriction for the cell identifier signal to control frequency leakage to adjacent frequency;

The time delay unit generates the fixed delay Td according to the searching result of the synchronization searching unit;

The cell identifier signal code generated by the cell identifier signal generating unit is coupled to input end of the power amplifier in the downlink circuit structure of the repeater via the D/A conversion unit, up-conversion unit, and filtering unit and then transmitted to the coverage of the repeater along with base station signals forwarded by the repeater, i.e., the cell identifier generator module can generate and transmit the cell identifier signal according to the fixed time difference Td and a specific code word.

Figure 3:
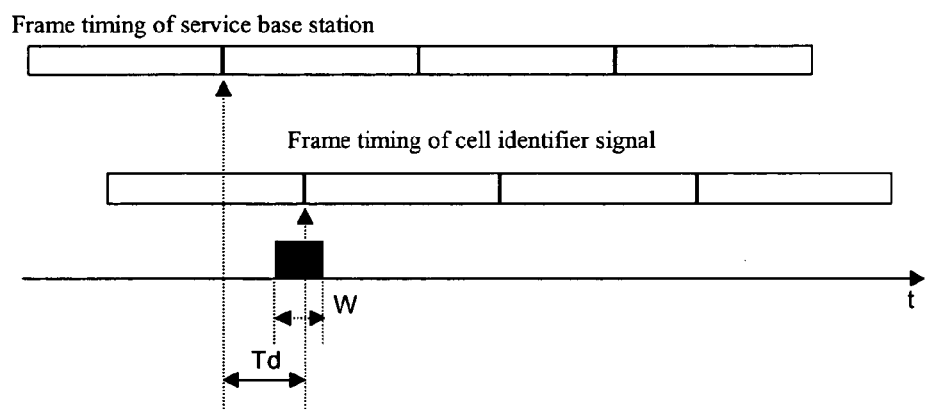
FIG. 3 is a schematic diagram of the timing relationship between cell identifier signal frame and service base station frame.
Figure 5:
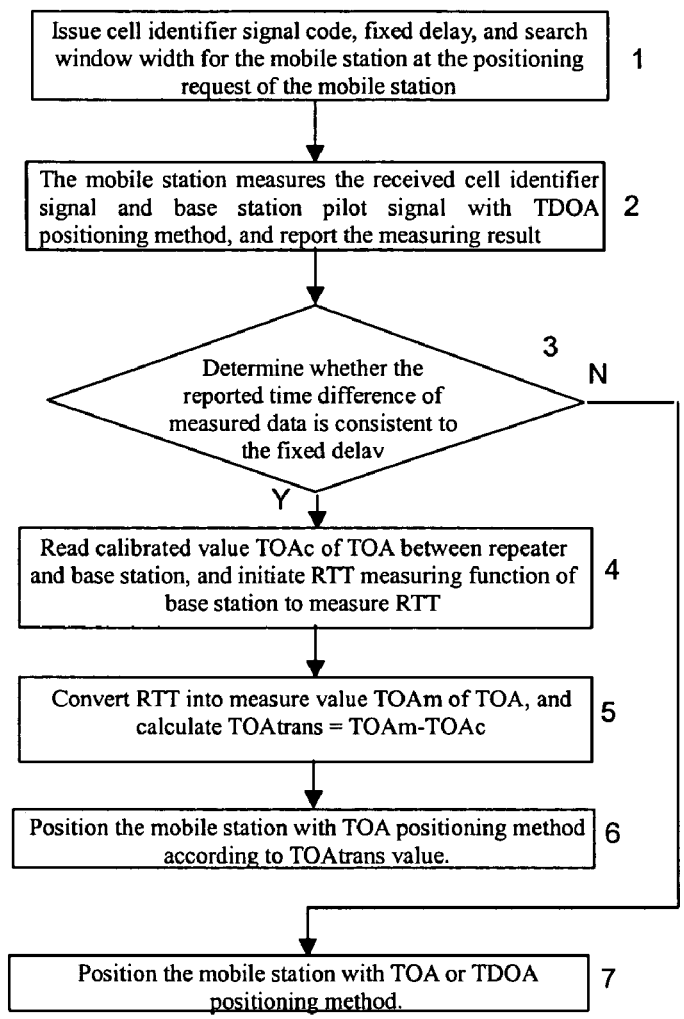
FIG. 5 is a flowchart of the mobile station positioning method according to the present invention.
Figure 6:
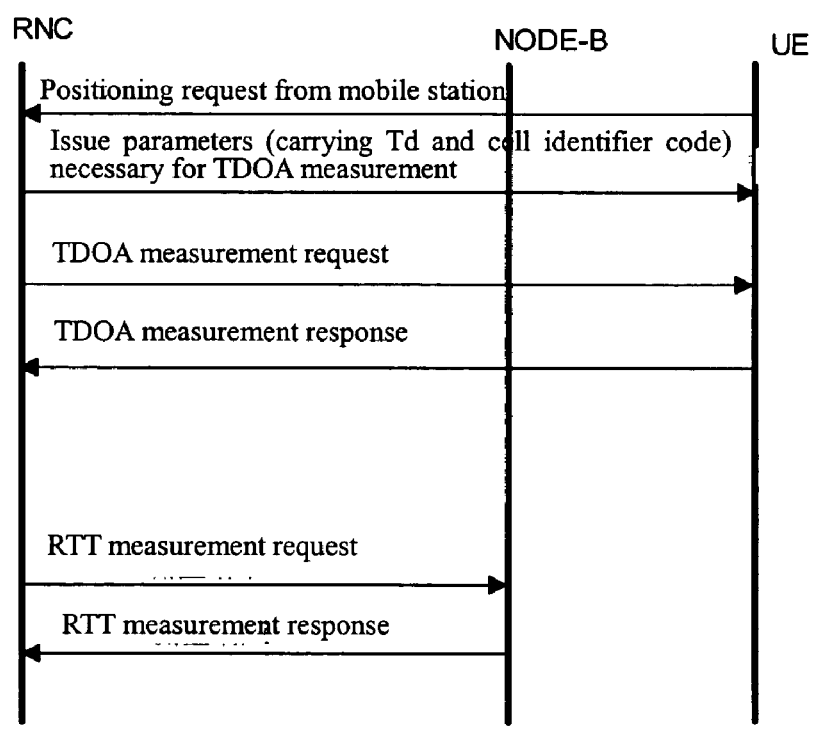
FIG. 6 is a diagram illustrating the mobile station positioning method according to the present invention.

The mobile station positioning method based on a repeater that supports mobile station positioning is further described as follows, with reference to FIG. 5 and FIG. 6:

Step 1: Issue cell identifier signal code, fixed delay Td and search window width W for the mobile station according to the positioning request of the mobile station;

Wherein the cell identifier signal code comprises a scrambling code different from the adjacent base stations, which is chosen from the scrambling code set of the base station;

As shown in FIG. 3, the fixed delay Td represents time delay between start time of cell identifier signal frame and start time of service base station pilot signal frame; fixed delay Td determines the central position of the search window; search window width W defines the width of the search window; the mobile station searches for the cell identifier signal in the time range (defined by center Td and width W) according to the scrambling code corresponding to the cell identifier signal issued from the network.

Figure 1:
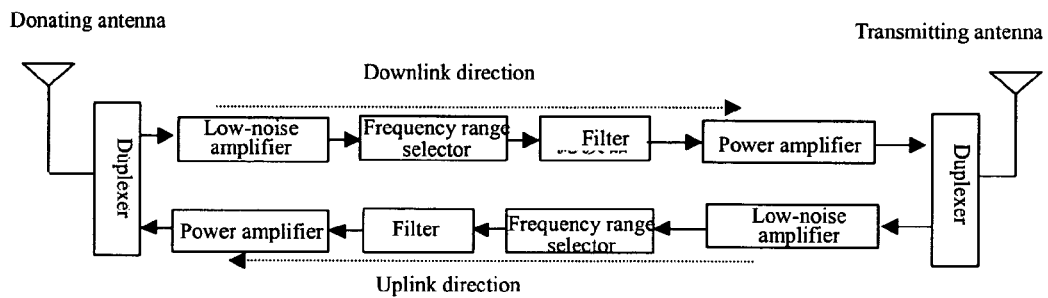
FIG. 1 shows the diagram of a conventional repeater.
Figure 4:
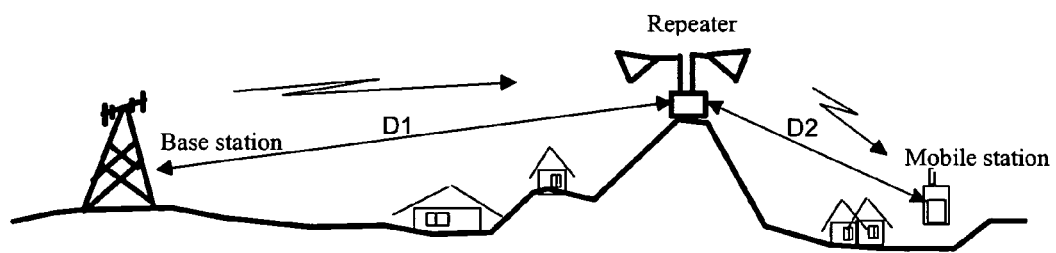
FIG. 4 is a schematic diagram of an application that utilizes a repeater to position mobile stations.

Step 2: The mobile station measures TDOAs of received cell identifier signal and base station pilot signal with TDOA positioning method and reports the measured data;

Step 3: Determine whether there is a time difference consistent to the fixed delay Td between cell identifier signal frame and base station pilot signal frame according to the measured data reported from the mobile station, i.e., determine whether to use the TOA positioning method with the repeater as the reference point to position the mobile station on the basis that whether there is time delay Td in the TDOA measuring result; if there is a time difference that is consistent to fixed delay go to step 4; otherwise go to step 7;

Step 4: Read the calibrated value $TOA_c$ of TOA between the repeater and the base station, and initiate RTT measuring function of the base station;

The calibrated value $TOA_c$ is obtained during the calibration process with the following method after the repeater is installed: place a common 3G cell phone at several meters to the repeater, and utilizes RTT (Round Trip Time) measuring function of the base station to measure RTT at the cell phone, $TOA_c$ is calculated as: $TOA_c=(1/2)$ RTT; as shown FIG. 4, the calibrated value $TOA_c$ between repeater and service base station is D1 shown in FIG. 1;

Step 5: Convert the measured RTT reported from the base station into measured value $TOA_m$ of TOA, herein $TOA_m=(1/2)$ RTT, which is the TOA from the mobile station to the base station via the repeater, subtract the calibrated value $TOA_c$ of TOA from $TOA_m$ and take the result as TOA $TOA_{trans}$ from the mobile station to the repeater, i.e., $TOA_{trans}=TOA_m-TOA_c$; $TOA_{trans}$ is D2 shown in FIG. 4;

Step 6: Use a common TOA algorithm to determine the distance from the mobile station to the repeater to accomplish mobile station positioning work, i.e., calculate the distance from the mobile station to the repeater with calibrated value of TOA from the base station and repeater and TDOA between the base station and mobile station.

Step 7: If there is no fixed delay Td between cell identifier signal frame and base station pilot signal frame, it indicates the mobile station is not in the coverage of the repeater; in this case, mobile station positioning can be carried out with conventional TDOA method or TOA method.

A repeater that supports mobile station positioning, wherein:

The method according to the present invention can be implemented in the conventional protocol framework of 3GPP (Third Generation Partner Project) with signaling and measuring functions defined in conventional protocols.

The invention claimed is:

1. A method for positioning a mobile station including a repeater comprising a cell identifier generator module in a downlink circuit structure of the repeater, wherein the cell identifier generator module comprises: a synchronization searching unit for searching for a base station pilot signal; a time delay unit for generating a fixed delay according to the searching result from the synchronization searching unit; and a cell identifier signal generating unit for generating a cell identifier signal; wherein is a delay between a frame start time of the base station pilot signal and a frame start time of the cell identifier signal is the fixed delay; the method comprising the steps of:

(1) issuing the cell identifier signal, the fixed delay, and a search window width from the repeater in response to a positioning request from the mobile station, wherein the cell identifier signal is searched in a time range defined by the search window width and the fixed delay;

(2) measuring a Time Difference Of Arrival (TDOA) between the cell identifier signal and the base station pilot signal and reporting the measured TDOA, by the mobile station;

(3) determining whether the value of TDOA equals to the fixed delay; if so, going to step (4); otherwise going to step (7);

(4) measuring a Time Of Arrival (TOA), $TOA_m$, from the mobile station to the base station through the repeater;

(5) determining a value of $TOA_{trans}$ with the formula: $TOA_{trans} = TOA_m - TOA_c$, wherein the $TOA_{trans}$ means TOA from the mobile station to the repeater, and the $TOA_c$, means a calibrated TOA from the repeater to the base station;

(6) calculating the distance between the mobile station and the repeater through multiplying $TOA_{trans}$ with light velocity; and (7) determining the position of the mobile station.

2. The method for positioning a mobile station according to claim 1, wherein said cell identifier signal is a scrambling code of the base station, which is different from that of adjacent base stations.

3. The method for positioning a mobile station according to claim 1, wherein in the step (7), said mobile station is positioned via TDOA positioning method.

4. The method for positioning a mobile station according to claim 1, wherein in the step (7), said mobile station is positioned via TOA positioning method.

* * * * *